US010158509B2

(12) United States Patent
Xu et al.

(10) Patent No.: US 10,158,509 B2
(45) Date of Patent: Dec. 18, 2018

(54) METHOD AND APPARATUS FOR POLAR RECEIVER WITH PHASE-AMPLITUDE ALIGNMENT

(71) Applicant: Innophase Inc., Chicago, IL (US)

(72) Inventors: Yang Xu, Chicago, IL (US); Sara Munoz Hermoso, Chicago, IL (US)

(73) Assignee: Innophase Inc., San Diego, CA (US)

( * ) Notice: Subject to any disclaimer, the term of this patent is extended or adjusted under 35 U.S.C. 154(b) by 0 days.

(21) Appl. No.: 14/863,174

(22) Filed: Sep. 23, 2015

(65) Prior Publication Data

US 2017/0085405 A1  Mar. 23, 2017

(51) Int. Cl.
H03D 3/18 (2006.01)
H03D 3/24 (2006.01)
H04L 27/227 (2006.01)
H04L 27/34 (2006.01)

(52) U.S. Cl.
CPC ...... *H04L 27/2272* (2013.01); *H04L 27/3444* (2013.01); *H04L 2201/02* (2013.01)

(58) Field of Classification Search
None
See application file for complete search history.

(56) References Cited

U.S. PATENT DOCUMENTS

| 4,271,412 A | 6/1981 | Glass |
| 4,322,819 A | 3/1982 | Hyatt |
| 5,325,095 A | 6/1994 | Vadnais |
| 5,493,581 A | 2/1996 | Young |
| 5,635,864 A | 6/1997 | Jones |
| 6,161,420 A | 12/2000 | Dilger |

(Continued)

FOREIGN PATENT DOCUMENTS

| JP | 07221570 | 8/1995 |
| JP | 11088064 | 3/1999 |

(Continued)

OTHER PUBLICATIONS

Jose Maria Lopez-Villegas et al., BPSK to ASK Signal Conversion Using Injection-Locked Oscillators—Part I: Theory, Dec. 2005, IEEE Transactions on Microwave Theory and Techniques, vol. 53, No. 12, available online at: http://diposit.ub.edu/dspace/bitstream/2445/8751/1/529612.pdf.

(Continued)

*Primary Examiner* — Shuwang Liu
*Assistant Examiner* — Gina McKie
(74) *Attorney, Agent, or Firm* — Invention Mine LLC

(57) ABSTRACT

Systems and methods are provided for aligning amplitude and phase signals in a polar receiver. A receiver generates digital amplitude and phase signals representing the amplitude and phase of a modulated input signal. At least one of the digital signals is filtered using a fractional delay filter with a variable delay. The delay of the fractional delay filter is adjusted to align the amplitude and phase signals. In some embodiments, an error vector magnitude is determined by comparing in-phase and quadrature values of the signal with values corresponding to a constellation point, and the delay is adjusted based on the error vector magnitude. The fractional delay filter may be a finite impulse response filter with coefficients stored in a lookup table that correspond to different delays.

20 Claims, 6 Drawing Sheets

(56) References Cited

U.S. PATENT DOCUMENTS

| | | |
|---|---|---|
| 6,369,659 B1 | 4/2002 | Delzer |
| 6,556,636 B1 | 4/2003 | Takagi |
| 6,587,187 B2 | 7/2003 | Watanabe |
| 6,975,165 B2 | 12/2005 | LopezVillegas |
| 7,042,958 B2 | 5/2006 | Biedka |
| 7,095,274 B2 | 8/2006 | LopezVillegas |
| 7,332,973 B2 | 2/2008 | Lee |
| 7,447,272 B2 | 11/2008 | Haglan |
| 7,564,929 B2 | 7/2009 | LopezVillegas |
| 7,602,244 B1* | 10/2009 | Holmes ............... H03F 1/0266 330/149 |
| 7,773,713 B2 | 8/2010 | Cafaro |
| 7,888,973 B1 | 2/2011 | Rezzi |
| 8,421,661 B1 | 4/2013 | Jee |
| 8,498,601 B2 | 7/2013 | Horng |
| 8,666,325 B2 | 3/2014 | Shute |
| 8,804,875 B1 | 8/2014 | Xu |
| 8,854,091 B2 | 10/2014 | Hossain |
| 8,941,441 B2 | 1/2015 | Testi |
| 9,083,588 B1* | 7/2015 | Xu ............... H04L 27/227 |
| 9,178,691 B2 | 11/2015 | Shimizu |
| 9,240,914 B2 | 1/2016 | Yao |
| 9,497,055 B2 | 11/2016 | Xu |
| 9,673,828 B1 | 6/2017 | Xu |
| 9,673,829 B1 | 6/2017 | Xu |
| 2001/0001616 A1 | 5/2001 | Rakib |
| 2002/0132597 A1 | 9/2002 | Peterzell |
| 2003/0053554 A1 | 3/2003 | McCrokle |
| 2004/0036538 A1 | 2/2004 | Devries |
| 2004/0100330 A1 | 5/2004 | Chandler |
| 2005/0285541 A1 | 12/2005 | LeChevalier |
| 2006/0193401 A1 | 8/2006 | Lopez Villegas |
| 2006/0285541 A1 | 12/2006 | Roy |
| 2008/0112526 A1 | 5/2008 | Yi |
| 2008/0150645 A1 | 6/2008 | McCorquodale |
| 2008/0192872 A1 | 8/2008 | Lindoff |
| 2008/0192877 A1 | 8/2008 | Eliezer |
| 2008/0205709 A1 | 8/2008 | Masuda |
| 2008/0220735 A1 | 9/2008 | Kim |
| 2008/0291064 A1* | 11/2008 | Johansson ........... H03M 1/0836 341/94 |
| 2011/0003571 A1 | 1/2011 | Park |
| 2011/0019657 A1 | 1/2011 | Zaher |
| 2011/0050296 A1 | 3/2011 | Fagg |
| 2011/0159877 A1* | 6/2011 | Kenington ............. H01Q 1/246 455/445 |
| 2011/0260790 A1* | 10/2011 | Haddad ................ H03F 1/30 330/107 |
| 2011/0298557 A1 | 12/2011 | Kobayashi |
| 2011/0299632 A1* | 12/2011 | Mirzaei ............... H04B 1/006 375/340 |
| 2011/0300885 A1 | 12/2011 | Darabi |
| 2012/0074990 A1 | 3/2012 | Sornin |
| 2012/0256693 A1 | 10/2012 | Raghunathan |
| 2012/0306547 A1 | 12/2012 | Arora |
| 2013/0143509 A1 | 6/2013 | Horng |
| 2013/0257494 A1 | 10/2013 | Nikaeen |
| 2014/0023163 A1 | 1/2014 | Xu |
| 2014/0133528 A1* | 5/2014 | Noest ................. H04B 1/0475 375/219 |
| 2014/0185723 A1* | 7/2014 | Belitzer ............... H03L 7/08 375/354 |
| 2014/0269999 A1 | 9/2014 | Cui |
| 2015/0180685 A1* | 6/2015 | Noest ................. H04B 1/0475 375/219 |
| 2015/0207499 A1 | 7/2015 | Horng |

FOREIGN PATENT DOCUMENTS

| | | |
|---|---|---|
| JP | 1187313 | 3/2002 |
| WO | 2012132847 | 4/2012 |

OTHER PUBLICATIONS

International Search Report for PCT/US2013/024159 dated Apr. 9, 2013.
Chi-Tsan Chen, Cognitive Polar Receiver Using Two Injection-Locked Oscillator Stages, IEEE Transactions on Microwave Theory and Techniques, vol. 59, No. 12, Dec. 2011.
N. Siripon, et al., Novel Sub-Harmonic Injection-Locked Balanced Oscillator, Microwave and Systems Research Group (MSRG), School of Electronics, Computing and Mathematics, University of Surrey, Sep. 24, 2011, 31st European Microwave Conference.
Behzad Razavi, A Study of Injection Pulling and Locking in Oscillators, Electrical Engineering Department, University of California, 2003, IEEE, Custom Integrated Circuits Conference.
Marc Tiebout, A 50GHz Direct Injection Locked Oscillator Topology as Low Power Frequency Divider in 0.13 μm CMOS, Infineon Technologies AG, Solid-State Circuits Conference, 2003, pp. 73-76, 29th European ESSCIRC.
Chi-Tsan Chen et al., Wireless Polar Receiver Using Two Injection-Locked Oscillator Stages for Green Radios, IEEE MTT-S International, Jun. 2011.
International Search Report and Written Opinion for PCT/US2014/030525 dated Jul. 24, 2014.
Aeroflex, Application Note, Measurement of Frequency Stability and Phase Noise, Feb. 2007, part No. 46891/865.
Hewlett Packard, Phase Noise Characterization of Microwave Oscillators, Frequency Discriminator Method, Sep. 1985, USA.
Claude Frantz, Frequency Discriminator, published 1994.
International Search Report and Written Opinion for PCT/US2014/029055 dated Sep. 15, 2014.
Notification of Transmittal of the International Search Report and the Written Opinion of the International Search Authority, or the Declaration, dated Feb. 28, 2017, 7 pages.
Henzler, S., "Time-to_Digital Converters", Springer Series in Advanced Microelectronics 29, DOI, 10.1007/978-90-481-8628-0_2, copyright Springer Science+Business Media B.V. 2010, Chapter 2, pp. 15 pages.
Lin, et al., "Single-Stage Vernier Time-to-Digital Converter with Sub-Gate Delay Time Resolution", Circuits and Systems, 2011, 2, 365-371, Oct. 2011.
Nazari, et al., "Polar Quantizer for Wireless Receivers: Theory, Analysis, and CMOS Implementation", IEEE Transactions on Cricuits and Systems, vol. 61, No. 3, Mar. 2014.
Jovanovic, et al., "Vernier's Delay Line Time-to-Digital Converter", Scientific Publications of the State University of Novi Pazar, Ser. A: Appl. Math. Inform. and Mech., vol. 1, 1 (2009), pp. 11-20.
Dudek, et al., "A High-Resolution CMOS Time-to-Digital Converter Utilizing a Vernier Delay Line", IEEE Transactions on Solid-State Circuits, vol. 35, No. 2, Feb. 2000.
Effendrik, P., "Time-to-Digital Converter (TDC) for WiMAX ADPLL in State-of-The-Art 40-nm CMOS", MSc Thesis, Apr. 18, 2011, 80 pages.
International Search Report and Written Opinion for PCT/US2014/026459 dated Jul. 28, 2014.
Notification of Transmittal of the International Search Report and the Written Opinion of the International Searching Authority, or the Declaration, for PCT/US16/53484, dated Dec. 19, 2016, 8 pages.
Dongyi Liao, et al., "An 802.11a/b/g/n Digital Fractional-N PLL With Automatic TDC Linearity Calibration for Spur Cancellation", IEEE Journal of Solid-State Circuits, 0018-9200 © 2017 IEEE.; Jan. 16, 2017.
Renaldi Winoto1, et al. "A 2×2 WLAN and Bluetooth Combo SoC in 28nm CMOS with On-Chip WLAN Digital Power Amplifier, Integrated 2G/BT SP3T Switch and BT Pulling Cancelation", ISSCC 2016 / Session 9/ High-Performance Wireless / 9.4, 2016 IEEE International Solid-State Circuits Conference; Sep. 4, 2016.
Stefano Pellerano, at al. "A 4.75-GHz Fractional Frequency Divider-by-1.25 With TDC-Based All-Digital Spur Calibration in 45-nm CMOS", 3422 IEEE Journal of Solid-State Circuits, vol. 44, No. 12, Dec. 2009.
Jianjun Yu and Fa Foster Dai, "A 3-Dimensional Vernier Ring Time-to-digital Converter in 0.13μm CMOS", Electrical and Computer Engineering, Auburn University, Auburn, AL 36849, USA, Sep. 19, 2010.

(56) References Cited

OTHER PUBLICATIONS

William Putnam, Julius Smith, "Design of Fractional Delay Filters Using Convex Optimization", Department of Electrical Engineering and, Center for Research in Music and Acoustics (CCRMA), Stanford University, Stanford, CA 94305-8180; Oct. 1997.

William Putnam, Julius Smith, "Design of Fractional Delay Filters Using Convex Optimization", Department of Electrical Engineering and Center for Research in Music and Acoustics (CCRMA) Stanford University Stanford, CA 94305-8180. Published in IEEE: workshop on applications of signal processing to audio and acoustics; Oct. 1997.

Antonio Liscidini, Luca Vercesi, and Rinaldo Castello, "Time to Digital Converter based on a 2-dimensions Vernier architecture", University of Pavia Via Ferrata 1, 27100 Pavia, Italy; Sep. 13, 2009.

Ahmad Mirzaei, et al, Multi-Phase Injection Widens Lock Range of Ring-Oscillator-Based Frequency Dividers, IEEE Journal of Solid-State Circuits, vol. 43, No. 3, Mar. 2008.

Jun-Chau Chien, et al, Analysis and Design of Wideband Injection-Locked Ring Oscillators With Multiple-Input Injection, EEE Journal of Solid-State Circuits, vol. 42, No. 9, Sep. 2007.

International Search report and Written Opinion for PCT/US18/27222 dated Jun. 28, 2018.

Hamid R. Rategh, et al., Superharmonic Injection Locked Oscillators as Low Power Frequency Dividers, Stanford University, Stanford, California, IEEE 1998.

Pei-Kang Tsai, et al., Wideband Injection-Locked Divide-by-3 Frequency Divider Design with Regenerative Second-Harmonic Feedback Technique, RF@CAD Laboratory, Department of Electrical Engineering, National Cheng Kung University, Tainan, Taiwan 2009.

Paul O'Brien, et al.; Analog Devices Raheen Business Park Limerick Ireland paul-p . . . "A Comparison of Two Delay Line Discriminator Implementations for Low Cost Phase Noise Measurement." (2010).

International Preliminary Report on Patentability for PCT/US2016/064772 dated Jun. 14, 2018.

\* cited by examiner

METHOD AND APPARATUS FOR POLAR RECEIVER WITH PHASE-AMPLITUDE ALIGNMENT

BACKGROUND

Communications transceivers may utilize numerous architectures to recover data from a modulated carrier signal. These architectures include coherent demodulation, using either intermediate frequency conversion or direct-conversion receivers. Such receivers typically recover or regenerate the communications carrier signal using a phase-locked loop (PLL) and coherent demodulation. Recently, polar receiver architectures have been proposed that extract the modulation phase components from a received modulation signal without using a carrier recovery circuitry. However, the proposed polar receiver architectures and associated signal processing have deficiencies that result in poor performance and high bit error rates (BER). Accordingly, there is a need for improved polar receiver signal processing and architectures.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
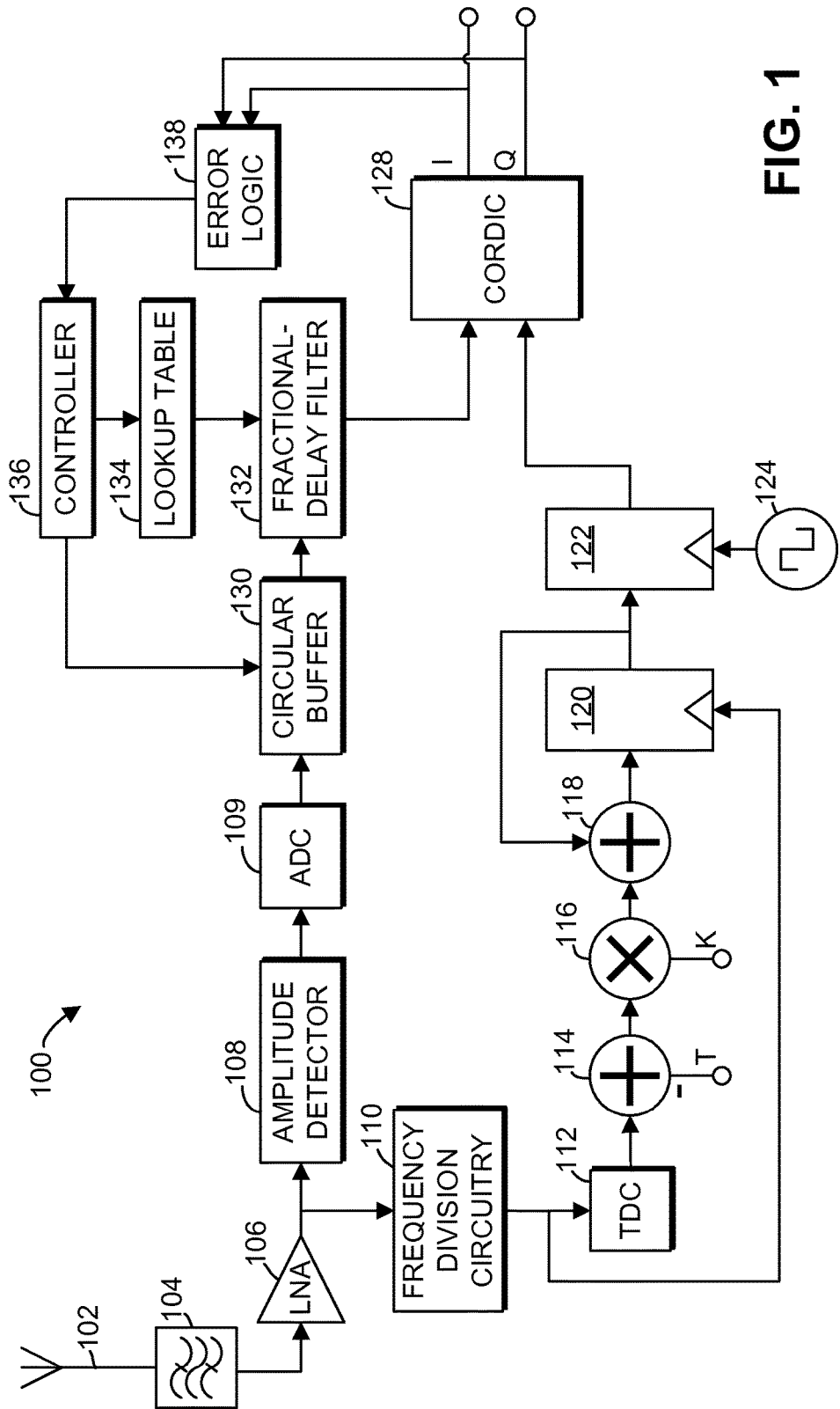
FIG. 1 is a functional block diagram of a polar receiver according to some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

In an exemplary embodiment illustrated in FIG. 1, a polar receiver 100 receives an incoming radio-frequency (RF) signal through an input node, such as antenna 102. In some embodiments, the incoming radio-frequency signal, also referred to herein as a modulated carrier signal, has a frequency in the range of 2412 MHz-2484 MHz, although the use of the polar receiver 100 is not limited to that frequency range. The incoming radio-frequency signal is filtered by a bandpass filter 104 and amplified by a low-noise amplifier (LNA) 106. The polar receiver 100 operates to receive and decode frequency modulated or phase-modulated radio-frequency signals, such as signals modulated using phase shift keying (PSK) or quadrature amplitude modulation (QAM). As the term is used in the present disclosure, phase-modulated signals include signals that are modulated in phase (e.g., binary phase-shift keying, quadrature phase-shift keying, 8-PSK, or 16-PSK) as well as signals that are modulated in both phase and amplitude (e.g., 16-QAM, 64-QAM, or 256-QAM). Frequency modulated signals include, among others, frequency shift keying (FSK) signals such as binary frequency-shift keying (BFSK) signals, multiple frequency-shift keying (MFSK) signals, and minimum-shift keying (MSK) signals.

While some of the embodiments described herein refer to the demodulation of phase-modulated signals, it should be noted that the disclosed embodiments can also be used to demodulate frequency-modulated (FM) signals, based on the mathematical relationship between changes in frequency and changes in phase. Both phase-modulated and frequency-modulated signals are modulated signals that have a variable phase component.

The polar receiver 100 includes an amplitude detector 108 such as an envelope detector or a product detector, which operates to provide a signal representing the amplitude of the modulated radio-frequency signal. The amplitude detector 108 may operate using various techniques such as, for example, signal rectification followed by low-pass filtering. The signal representing the amplitude of the modulated radio-frequency signal is converted to a digital form with an analog-to-digital converter (ADC) 109. The ADC operates to generate a series of digital amplitude signals representing the amplitude of the modulated radio-frequency signal. In some embodiments, ADC 109 samples the amplitude of the modulated radio-frequency signal at 160 Msps.

The polar receiver 100 is provided with frequency division circuitry 110. The frequency division circuitry has an input for receiving the modulated radio-frequency input signal from the low-noise amplifier 106 and a frequency-divided output for providing a frequency-divided output signal to a trigger input of a time-to-digital converter (TDC) 112. The frequency division circuitry operates to divide the frequency of the input signal by a frequency divisor. In some embodiments, the frequency division circuitry can be implemented using a harmonic injection-locked oscillator, a digital frequency divider, or a combination thereof, among other possibilities.

The time-to-digital converter 112 operates to measure a characteristic time of the frequency-divided signal, such as the period of the frequency-divided signal. The time-to-digital converter 112 may operate to measure the period of the frequency-divided signal by measuring an elapsed time between successive corresponding features of the frequency-divided signal. For example, the time-to-digital converter may measure the period of the frequency-divided signal by measuring a time between successive rising edges of the frequency-divided signal or the time between successive falling edges of the frequency-divided signal. In alternative embodiments, the time-to-digital converter may measure a characteristic time other than a complete period, such as an elapsed time between a rising edge and a falling edge of the frequency-divided signal.

In some embodiments, the time-to-digital converter 112 operates without the use of an external trigger such as a clock signal. That is, the time-to-digital converter 112 measures the time between two features (e.g., two rising edges) of the frequency-divided signal rather than the time between an external trigger signal and a rising edge of the frequency-divided signal. Because the start and end of the time period measured by the time-to-digital converter 112 are both triggered by the frequency-divided signal, rather than an external clock signal, the time-to-digital converter 112, is referred to herein as a self-triggered time-to-digital converter.

In the example of FIG. 1, the self-triggered time-to-digital converter 112 provides a digital time output that represents the period of the frequency-divided output signal. The digital time output is provided to a digital subtractor 114. The digital subtractor 114 operates to subtract a period offset value T from the digital time output, thereby generating an offset digital time output signal. The period offset value may be a constant value corresponding to an expected period of the frequency-divided signal in an unmodulated state, which may be expressed in native units used by the time-to-digital converter. For example, where the frequency of the frequency-divided signal is expressed by $f_d$, the period offset value T can be expressed by $$T = \frac{1}{f_d \cdot LSB}$$

where LSB is the amount of time represented by the least significant bit of the time-to-digital converter. The offset digital time output is thus at or near zero when no shift is occurring in the phase of the frequency-divided signal.

When a phase shift does occur in the modulated radio-frequency signal (a phase-modulated or frequency modulated carrier signal), this results in a temporary change in the period of the modulated radio-frequency signal, which in turn causes a temporary change in the period of the frequency-divided signal. This temporary change in the period of the frequency-divided signal is measured as a temporary change in the digital time output (and in the offset digital time output). In some embodiments, the offset digital time output is at or near zero during periods when the phase of the modulated radio-frequency signal remains steady, while a shift in the phase of the modulated radio-frequency signal results in the offset digital time output signal briefly taking on a positive or negative value, depending on the direction of the phase shift.

In some embodiments, the receiver 100 includes a digital multiplier 116. The multiplier 116 operates to multiply the offset digital time output by a scale factor K to generate a scaled digital time signal. The scale factor K may be used for example, to convert the offset digital time output signal to a scaled digital time signal that represents an angle (expressed, e.g. in radians) corresponding to a shift in the phase of the original modulated radio-frequency signal. To that end, the scale factor K may be selected as $$K = -2\pi f_c LSB$$

where $f_c$ is the frequency of the modulated radio-frequency signal (e.g, a frequency between 2412 MHz and 2484 MHz).

The offset digital time output signal (which may have been scaled in some embodiments) is provided to a digital integrator, implemented in polar receiver 100 using a digital adder 118 and a register 120. The digital integrator generates an integrated time signal. The register 120 may be clocked using the frequency-divided signal, resulting in one addition per cycle of the frequency-divided signal. In embodiments in which the offset digital time output signal represents a change in the phase of the modulated radio-frequency signal, the integrated time signal provides a value that represents the current phase of the modulated radio-frequency signal.

In polar receiver 100, the integrated time signal is sampled using a register 122, which may be clocked by a clock source 124. In some embodiments, the register 122 operates to sample the integrated time signal at 160 Msps, although other sampling rates may alternatively be used. In the embodiment of FIG. 1, frequency division circuitry 110, TDC 112, subtractor 114, multiplier 116, adder 118, and registers 120 and 122 operate as a phase detection circuit operative to generate a series of digital phase signals representing the phase of the modulated signal.

In some embodiments, the operation of the phase detection circuitry requires a greater number of processing cycles than the operation of the amplitude detection circuitry. In such embodiments, the polar receiver 100 includes componentry operative to align the signals from the amplitude detection circuitry and the phase detection circuitry, such that a digital signal representing the amplitude of the modulated signal at a particular time is paired with a digital signal representing the phase of the modulated signal at substantially the same time. In the embodiment of FIG. 1, such componentry includes a circular buffer 130 and fractional delay filter 132.

In an exemplary embodiment, the circular buffer 130 is initialized to have a write pointer set at register 0 and a read pointer with a value set to an initial value at the center of the circular buffer. The circular buffer may be, for example, a 64-element buffer addressable by a six-bit read pointer and a six-bit write pointer.

In some embodiments, the fractional delay filter 132 obtains a series of digital amplitude values from the circular buffer 130. For example, where the fractional delay filter 132 is implemented as a four-tap finite impulse response filter (FIR), the fractional delay filter 132 may receive four consecutive digital amplitude values from the circular buffer 130. The digital amplitude values provided to the fractional delay filter 132 may be four consecutive digital amplitude samples. The samples may be the most recent digital amplitude samples or, if additional delay is required to perform alignment, the provided values may be an earlier set of consecutive digital amplitude values stored in a buffer.

In embodiments in which the fractional delay filter 132 is implemented as a finite impulse response filter, fractional delay filter 132 may operate by multiplying digital amplitude values by respective coefficients obtained from a lookup table 134. For example, where four consecutive sampled amplitude values are designated as $w_0$, $w_1$, $w_2$, and $w_3$, the fractional delay filter 132 may operate to output the value $y = c_0 w_0 + c_1 w_1 + c_2 w_2 + c_3 w_3$, where $c_0$, $c_1$, $c_2$, and $c_3$ form a set of coefficients associated with respective taps of the finite impulse response filter. Different sets of coefficients may be associated with different fractional delays. For example, the lookup table 134 may store a set of coefficients associated with each available fractional delay value. Each fractional delay value may be identified by an index, such as an index running from 0 to 255, which may be conveyed by an eight-bit vector. A different number of indices (with respective associated sets of coefficients) may be used in other embodiments.

In the embodiment of FIG. 1, a controller 136 is operative to select the amount of delay. The selection of the amount of delay may be performed at both a coarse level and a fine level. At a coarse level, the controller 136 may select which taps are provided by the circular buffer 130 to the fractional delay filter 134. This allows control of the delay at the level of an integer number of samples. At a fine level, the controller 136 may determine which fractional delay is implemented by the fractional delay filter 132, for example by selecting, from the lookup table 134, a set of coefficients corresponding to the desired delay, allowing control of the delay at a level finer than an integer number of samples.

The filtered series of digital amplitude signals and the series of digital phase signals are provided to coordinate rotation digital computer (CORDIC) logic circuit 128. The CORDIC logic 128 is operative to identify in-phase (I) and quadrature (Q) components corresponding to a phase-modulated radio-frequency input signal. The identified in-phase and quadrature components may be used in turn to identify a particular symbol conveyed by the phase-modulated radio-frequency input signal, such as a quadrature amplitude modulation (QAM) symbol, using conventional techniques known to those skilled in the art.

In the embodiment of FIG. 1, the controller 136 selects the amount of the delay based on input from error logic 138 that operates on the I and Q signals from the CORDIC 128. In an exemplary embodiment, the error logic 138 operates to determine a probable constellation point based on the I and Q signals. The probable constellation point may be the constellation point nearest to the location indicated by the I and Q signals. Other decision boundaries may also be used for determining a probable constellation point, as is known to those skilled in the art. Selection of the probable constellation point may be performed based on maximum likelihood detection. The error logic 138 further operates to determine the magnitude of the error vector between the probable constellation point on the one hand and the I and Q signals from the CORDIC 128 on the other hand. The magnitude of the error vector is then provided by the error logic 138 to the controller 136. In some embodiments, the error logic 138 operates to generate an average error vector magnitude (or a sum of error vector magnitudes) based on error vector magnitudes from a plurality of symbols conveyed by the modulated signal. In such embodiments, the error vector magnitude provided to the controller 136 may be the average (or summed) error vector magnitude.

The controller 136 may operate in various ways to select the delay based on the input from the error logic 138. For example, the controller 136 may test different values of the delay to search for a delay value that minimizes the magnitude of the error vector. In some embodiments, the controller imposes a functional relationship between the magnitude of the error vector and a change to the delay, such that a particular error vector magnitude leads the controller to impose a particular change in the delay. This functional relationship may be stored in a table or may be calculated in real time by the controller.

Figure 2:
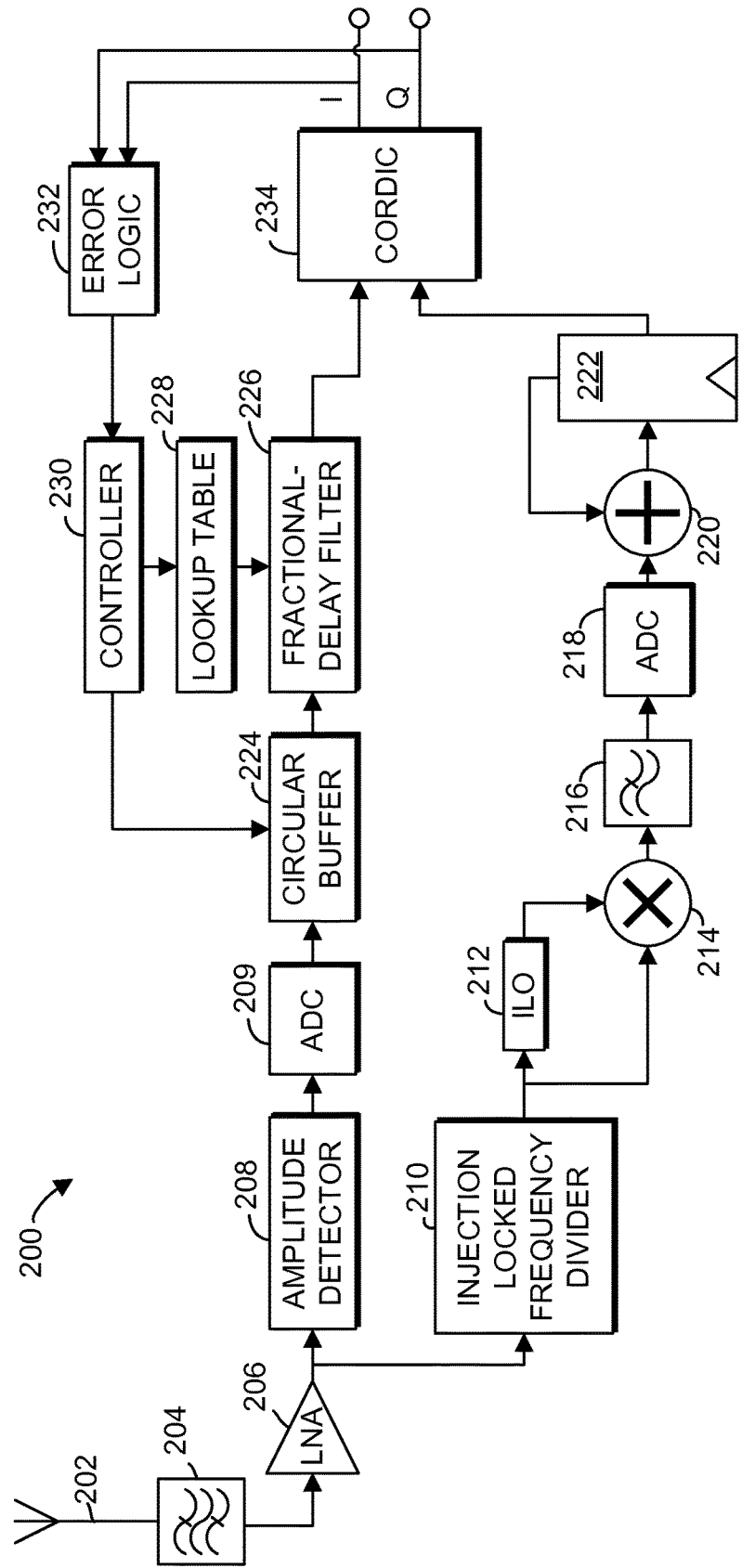
FIG. 2 is a functional block diagram of another polar receiver according to some embodiments.

The amplitude and phase alignment circuitry and methods described herein are not limited to the specific phase or amplitude detection circuitry illustrated in FIG. 1. For example, a polar receiver 200 in an alternative embodiment is illustrated in FIG. 2. Polar receiver 200 receives an incoming radio-frequency (RF) signal through an input node, such as antenna 202. The incoming radio-frequency signal is filtered by a bandpass filter 204 and amplified by a low-noise amplifier 206. The polar receiver 200 operates to receive and decode signals that include a variable phase component.

The polar receiver 200 includes an amplitude detector 208 such as an envelope detector or a product detector, which operates to provide a signal representing the amplitude of the modulated radio-frequency signal. The amplitude detector 208 may operate using various techniques such as, for example, signal rectification followed by low-pass filtering. The signal representing the amplitude of the modulated radio-frequency signal is converted to a digital form with an analog-to-digital converter (ADC) 209. The ADC operates to generate a series of digital amplitude signals representing the amplitude of the modulated radio-frequency signal. In some embodiments, ADC 209 samples the amplitude of the modulated radio-frequency signal at 160 Msps. In some embodiments, the amplitude signals may be sampled at 80 Msps or at another rate.

The polar receiver 200 includes an injection-locked frequency divider 210, which may be a second-harmonic injection-locked oscillator (ILO). The output of the injection locked frequency divider is phase compressed, in the sense that a phase shift of $\varphi$ at an input frequency f corresponds to a phase shift of $\varphi/N$ at the divided output frequency f/N. The phase-compressed output signal of the injection-locked frequency divider 210 is provided to an injection-locked oscillator 212, which is tuned to the divided output frequency f/N. The injection locked oscillator 212 operates such that a phase shift in the phase-compressed output signal leads, after a characteristic delay period, to a corresponding phase shift in the output of the injection-locked oscillator 212. The phase-compressed signal from frequency-divider 210 and the delayed phase-compressed signal from the injection locked oscillator 212 are combined at mixer 214, and the product is filtered by low-pass filter 216. The paths from frequency divider 210 and injection locked oscillator 212 to the mixer 214 are selected such that, in a steady state, the phase-compressed signal and the delayed low-pass signal have a phase difference of $\pi/2$. This phase difference may be implemented using, for example, one or more delay elements (not shown in FIG. 2). At the steady-state phase difference of $\pi/2$, the output of the low-pass filter 216 is substantially zero. However, any phase change in the input signal propagates more slowly through ILO 212, than it does along the path from frequency divider 210 to mixer 214. This leads to a temporary departure from $\pi/2$ in the phase difference at the inputs to mixer 214, resulting in a non-zero signal at the output of low-pass filter 216. This analog signal represents the rate of phase change. In an exemplary embodiment, this signal is digitized by analog to digital converter 218, and the result may be integrated by adder 220 and register 222 to provide a digital signal representing the phase of the modulated signal. The operation of the phase detection circuitry used in FIG. 2 may further be understood with reference to U.S. Pat. No. 9,083,588 (issued Jul. 14, 2015), the specification of which is incorporated herein by reference in its entirety.

In addition to the phase measurement circuitry illustrated in FIGS. 1 and 2, alternative techniques may be used to measure the phase of the modulated input signal. For example, a phase-locked loop may be used to lock on to the phase of the incoming modulated signal. An error signal output by the phase-locked loop may then be used to represent a rate of change of the phase of the modulated input signal, and that rate of change can be digitized and integrated to generate a series of digital signals representing the phase of the modulated signal.

In the polar receiver of FIG. 2, the series of digital amplitude signals representing the amplitude of the modulated signal is provided to a circular buffer 224 for coarse alignment and to fractional delay filter 226 for fine alignment with the series of digital phase signals representing the phase of the modulated signal. The fractional delay filter 226 may be a finite impulse response filter using coefficients selected from a lookup table 228. These coefficients may be selected to implement a variable delay selected by controller 230. Controller 230, in turn, selects the delay based on an error value (such as an error vector magnitude) provided by error logic 232. The error logic 232 determines the error value by comparing I and Q values corresponding to the modulated signal (as determined by a CORDIC 234) with I and Q values of a probable constellation point represented by the modulated signal. The CORDIC 234, error logic 232, and controller 230 operate together as alignment circuitry to adjust the variable delay to align the series of digital amplitude signals with the series of digital phase signals.

Alignment circuitry may be implemented using alternative components as well. For example, different levels of variable delay may correspond to different temperatures. In such an embodiment, a temperature sensor may provide an input to a lookup table (or to logic implementing a mathematical function) that selects a delay value (or an appropriate set of coefficients) that leads to proper alignment of the amplitude and phase signals at the measured temperature.

In some embodiments, the alignment circuitry operates to adjust the variable delay only in response to a predetermined trigger. For example, the variable delay may be adjusted in response to a change in temperature detected by a temperature sensor, in response to a bit error rate that exceeds a threshold, or in response to another trigger. In some embodiments, the adjustment of the variable delay may be performed periodically at predetermined intervals.

Figure 3:
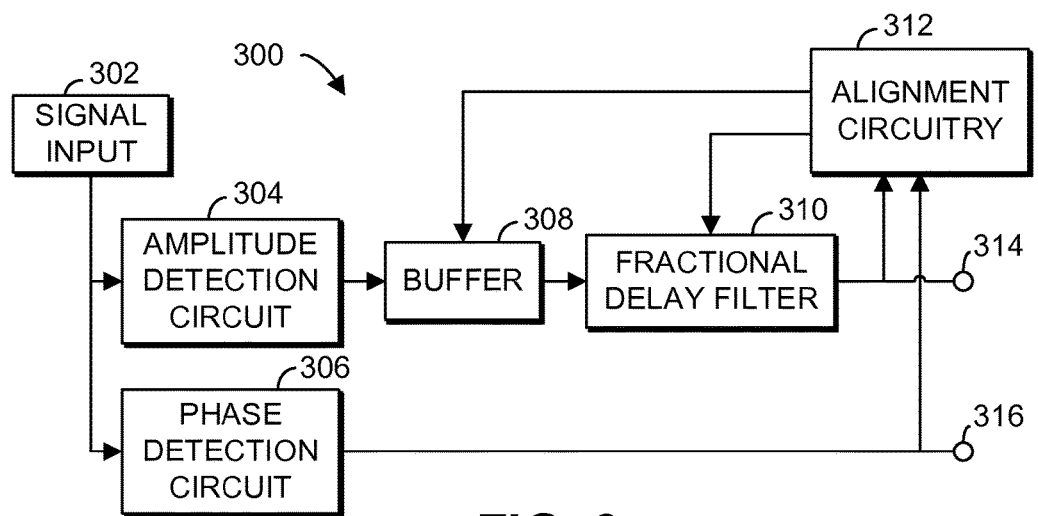
FIG. 3 is a functional block diagram illustrating a polar receiver architecture with a fractional delay filter along the amplitude path.

An architecture of a polar receiver 300 is illustrated in FIG. 3. A signal input 302 is provided to receive a modulated signal having a variable phase component. An amplitude detection circuit 304 generates a series of digital amplitude signals representing an amplitude of the modulated signal. A phase detection circuit 306 generates a series of digital phase signals representing a phase of the modulated signal. A buffer 308 may optionally be provided to implement a delay equal to an integral number of digital samples. A fractional delay filter 310 with a variable delay operates to filter the series of digital amplitude signals. Alignment circuitry 312 adjusts the variable delay of the fractional delay filter to align the series of digital amplitude signals with the series of digital phase signals. The alignment circuitry 312 may also operate to adjust an integral delay implemented by the buffer 308. The digital amplitude and phase signals may be provided at amplitude and phase output nodes 314 and 316 to a CORDIC and/or other known componentry for decoding the phase-modulated input signal.

Figure 4:
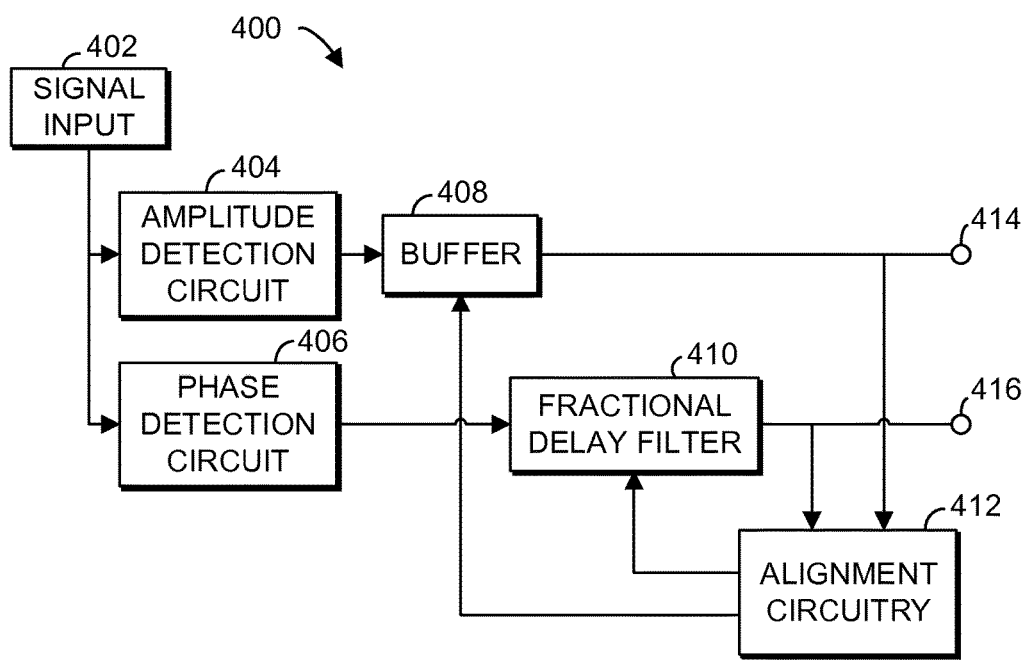
FIG. 4 is a functional block diagram illustrating a polar receiver architecture with a fractional delay filter along the phase path.

An alternative architecture is illustrated by polar receiver 400 of FIG. 4. As illustrated in FIG. 4, the fractional delay filter may operate on the series of digital phase signals. Specifically, a signal input 402 is provided to receive a modulated signal having a variable phase component. An amplitude detection circuit 404 generates a series of digital amplitude signals representing an amplitude of the modulated signal. A phase detection circuit 406 generates a series of digital phase signals representing a phase of the modulated signal. A buffer 408 may optionally be provided to implement a delay equal to an integral number of digital samples. A fractional delay filter 410 with a variable delay operates to filter the series of digital phase signals. Alignment circuitry 412 adjusts the variable delay of the fractional delay filter to align the series of digital phase signals with the series of digital amplitude signals. The alignment circuitry 412 may also operate to adjust an integral delay implemented by the buffer 408. The digital amplitude and phase signals may be provided at amplitude and phase output nodes 414 and 416 to a CORDIC or other known componentry for decoding the phase-modulated input signal.

Figure 5:
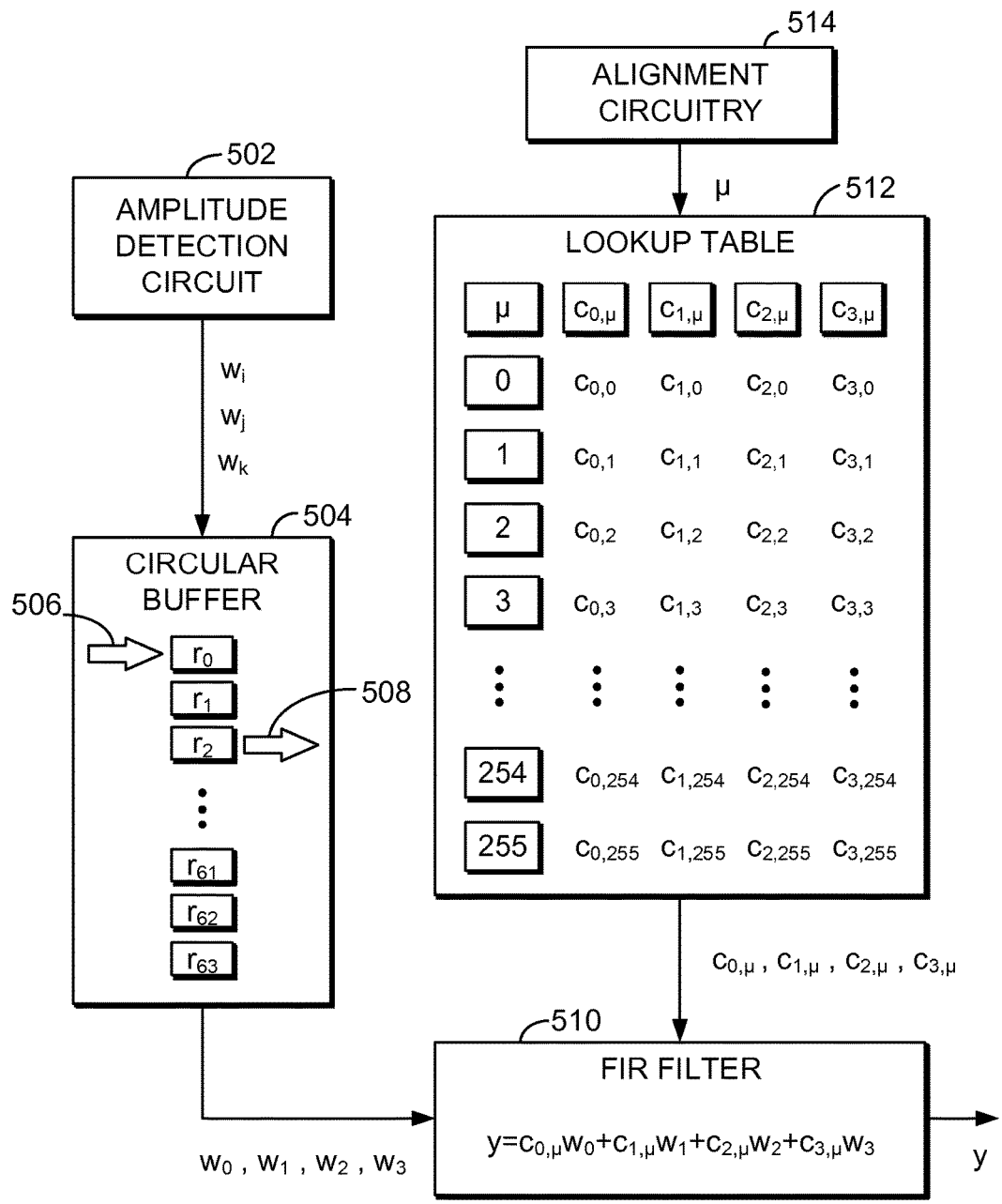
FIG. 5 is a functional block diagram illustrating an embodiment in which the fractional delay filter is implemented by a finite impulse response (FIR) filter.

Exemplary operation of a fractional delay filter is illustrated in FIG. 5. Amplitude detection circuit 502 provides a series of digital values (represented by $w_i$, $w_j$, $w_k$) to a circular buffer 504. (In alternative embodiments, a phase detection circuit may provide the series of digital values.) The circular buffer has a write pointer 506 and a read pointer 508. To provide coarse alignment (by integral values of the sample period), the relative positions of the read and write pointers may be adjusted. The circular buffer 504 provides digital values (represented by $w_0$, $w_1$, $w_2$, $w_3$) to a finite impulse response (FIR) filter 510. The finite impulse response filter 510 calculates the value $y = c_{0,\mu} w_0 + c_{1,\mu} w_1 + c_{2,\mu} w_2 + c_{3,\mu} w_3$, where the values $c_{0,\mu}$, $c_{1,\mu}$, $c_{2,\mu}$, and $c_{3,\mu}$ are coefficients selected from a lookup table 512. The lookup table 512 selects appropriate coefficients based on an input index $\mu$, where $\mu$ identifies one of a plurality of possible fractional delays. The input index $\mu$ may in turn be selected by alignment circuitry 514. As described in greater detail above, the alignment circuitry 514 may select the index $\mu$ (and thus the appropriate fractional delay) based on an error vector magnitude, based on a temperature measurement, or based on another input selected to facilitate alignment of phase and amplitude samples.

The coefficients $c_{0,\mu}$, $c_{1,\mu}$, $c_{2,\mu}$, and $c_{3,\mu}$ may be selected using one or more of various known techniques for implementing a fractional delay filter using a finite impulse response filter. For example, the coefficients may be selected based on convex optimization second order cone programming, as described in Putnam, William, and Julius Smith, "Design of fractional delay filters using convex optimization" (1997 IEEE ASSP Workshop on Applications of Signal Processing to Audio and Acoustics), the contents of which are incorporated herein by reference in their entirety. Coefficients may also be determined using, for example, a minimum mean square error (MMSE) technique.

Figure 6:
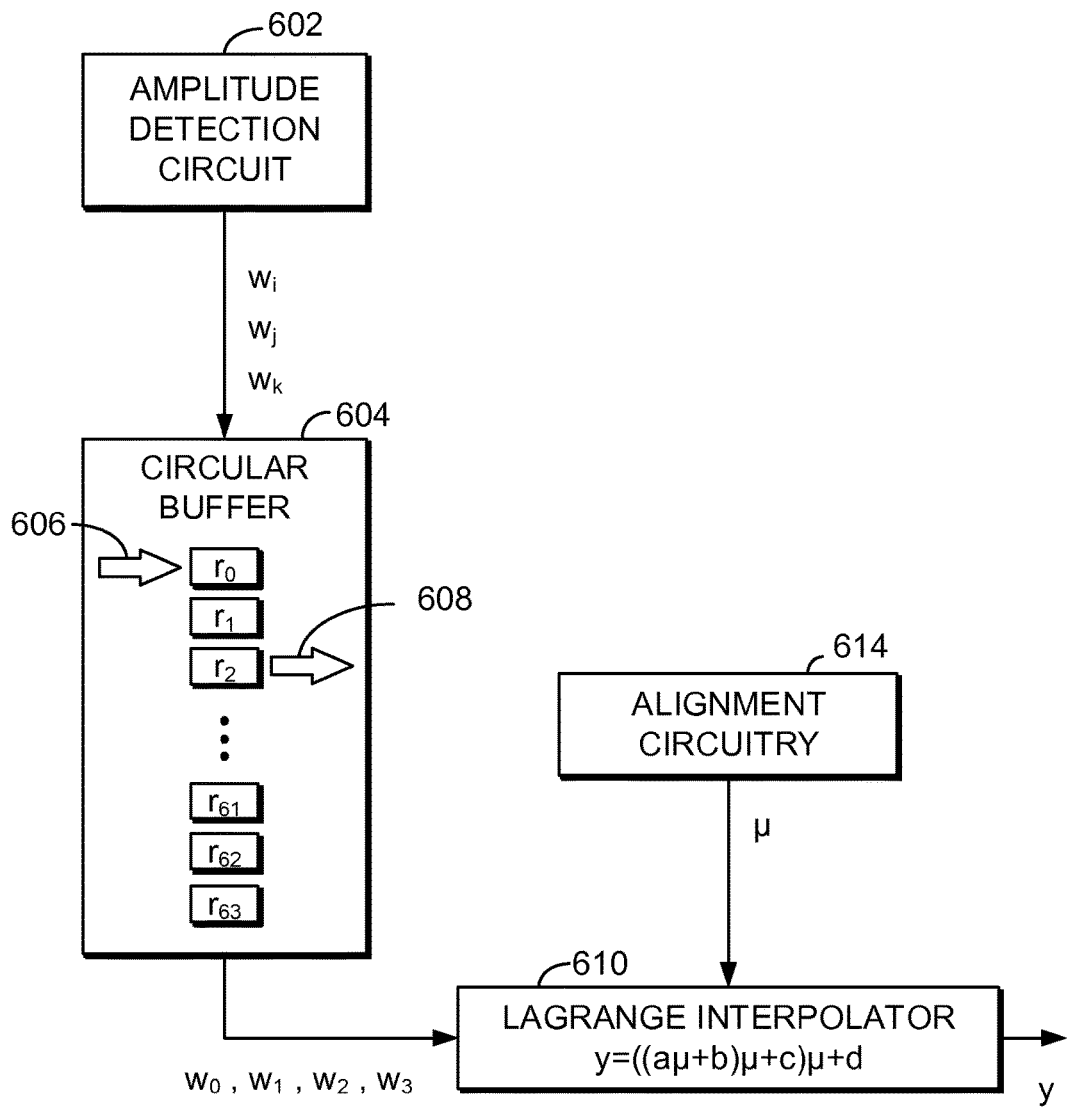
FIG. 6 is a functional block diagram illustrating an embodiment in which the fractional delay filter is implemented by a Lagrange interpolator.

In some embodiments, as illustrated in FIG. 6, the fractional delay filter is implemented using circuitry other than a finite impulse response filter, such as a Lagrange interpolator. In the example of FIG. 6, amplitude detection circuit 602 provides a series of digital values (represented by $w_i$, $w_j$, $w_k$) to a circular buffer 604. The circular buffer has a write pointer 606 and a read pointer 608. To provide coarse alignment (by integral values of the sample period), the relative positions of the read and write pointers may be adjusted. The circular buffer 604 provides digital values (represented by $w_0$, $w_1$, $w_2$, $w_3$) to a Lagrange interpolator 610. The Lagrange interpolator 610 calculates the value y in the form of a polynomial $y = ((a\mu + b)\mu + c)\mu + d$, where the values a, b, c, d are calculated according to the following equation $$\begin{bmatrix} a \\ b \\ c \\ d \end{bmatrix} = \frac{1}{6} \begin{bmatrix} -1 & 3 & -3 & 1 \\ 3 & -6 & 3 & 0 \\ -2 & -3 & 6 & -1 \\ 0 & 6 & 0 & 0 \end{bmatrix} \begin{bmatrix} w_0 \\ w_1 \\ w_2 \\ w_3 \end{bmatrix}$$

and where µ is a value representing the amount of the variable fractional delay. The value of µ may in turn be selected by alignment circuitry 614. As described in greater detail above, the alignment circuitry 614 may select the value µ (and thus the appropriate fractional delay) based on an error vector magnitude, based on a temperature measurement, or based on another input selected to facilitate alignment of phase and amplitude samples.

Embodiments in which the fractional delay filter is implemented as a finite impulse response filter with coefficients provided by a lookup table are generally expected to consume less power, to perform more quickly, and to require simpler hardware (e.g. requiring less chip area) than embodiments using a Lagrange interpolator.

While the exemplary embodiments disclosed herein illustrate the use of a four-tap fractional delay filter, it should be noted that a greater or lesser number of taps may also be used.

Figure 7:
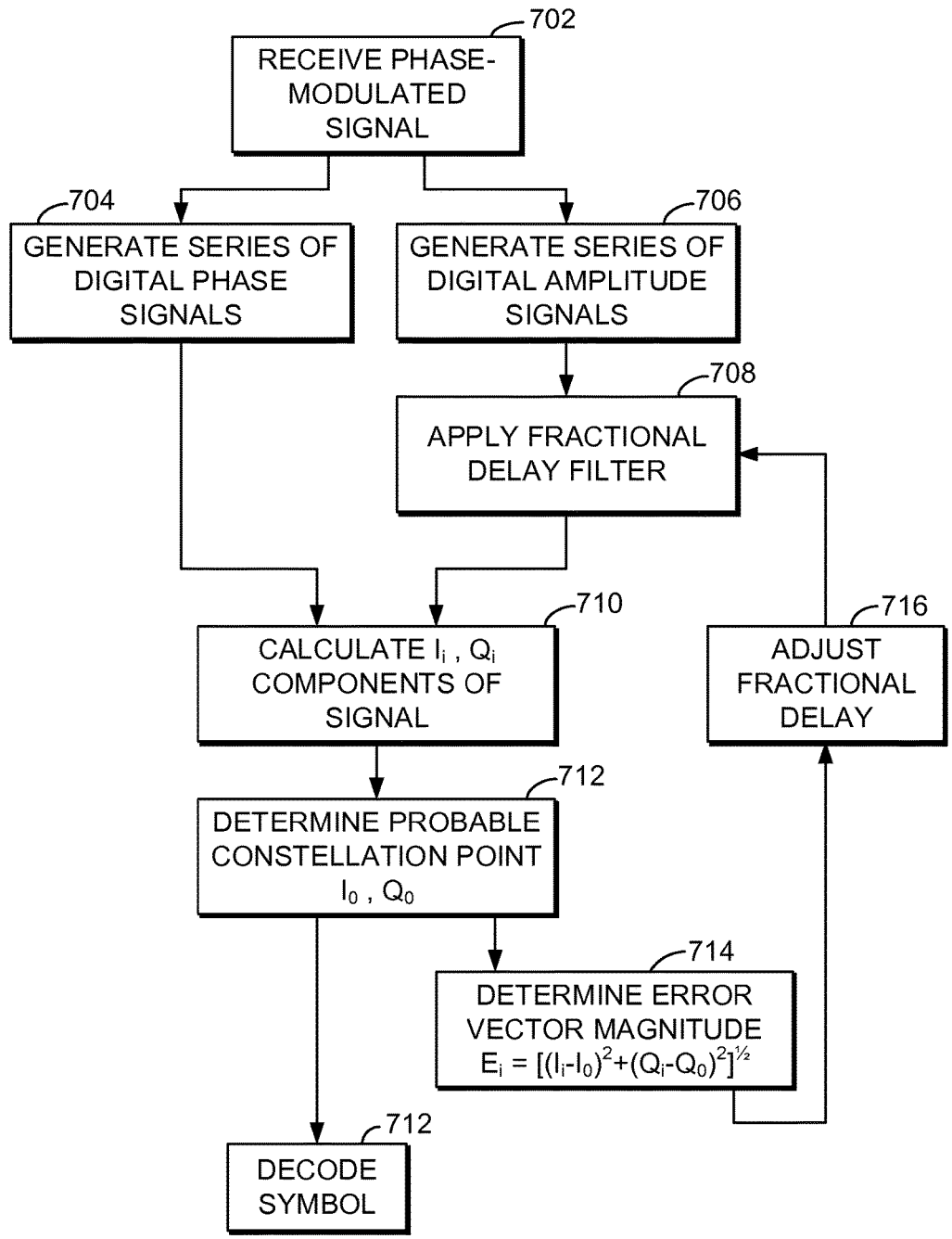
FIG. 7 is a flow diagram illustrating a method of aligning phase and amplitude signals using a fractional delay filter.

An exemplary method for aligning digital phase and amplitude signals is illustrated in the flow diagram of FIG. 7. In step 702, a polar receiver receives a phase-modulated input signal. In step 704, the receiver generates a series of digital phase signals representing the phase of the modulated input signal. In step 706, the receiver generates a series of digital amplitude signals representing an amplitude of the modulated signal. In step 708, the receiver filters the series of digital amplitude signals with a fractional delay filter that has a variable delay. (In alternative embodiments, the fractional delay filter may be applied to the digital phase signals.) In step 710, the receiver determines the in-phase and quadrature components $I_i$ and $Q_i$ of the input signal using, for example, a CORDIC. In step 712, the receiver determines a probable constellation point with components $I_0$ and $Q_0$.

For example, in the case of quadrature phase shift keying (QPSK), the selection of a probable constellation point may proceed according to Table 1.

TABLE 1

| If $I_i$ is | and $Q_i$ is | then $I_0$ is | and $Q_0$ is. |
|---|---|---|---|
| >0 | >0 | 1 | 1 |
| >0 | <0 | 1 | −1 |
| <0 | >0 | −1 | 1 |
| <0 | <0 | −1 | −1 |

It should be understood that different decision boundaries may be used for determining a probable constellation point, whether for QPSK modulation or for other modulation techniques, and that Table 1 is provided solely as an example.

As illustrated in step 712, the determined constellation point may be used in the decoding of an incoming symbol conveyed by the modulated input signal. For example, the symbol may be decoded as illustrated in Table 2, although numerous other decoding schemes may alternatively be used.

TABLE 2

| If $I_0$ is | and $Q_0$ is | then the symbol represents bits |
|---|---|---|
| >0 | >0 | 11 |
| >0 | <0 | 10 |
| <0 | >0 | 01 |
| <0 | <0 | 00 |

As illustrated in step 714, the probable constellation point determined in step 712 may be compared with the components $I_i$ and $Q_i$ of the input signal to determine the error vector magnitude E. In an exemplary embodiment, the error vector magnitude is determined by error logic as a Euclidean distance according to the following equation.

$$E_i = [(I_i - I_0)^2 + (Q_i - Q_0)^2]^{1/2}$$

In step 716, the receiver adjusts the fractional delay of the fractional delay filter based on the error vector magnitude in order to align the phase and amplitude signals. As described in greater detail above, the adjustment of the fractional delay may be performed based on a lookup table, such that a particular error value (such as an average error vector magnitude) leads to a predetermined adjustment to the delay. Alternatively, the adjustment of the fractional delay may be performed so as to minimize the average error vector magnitude. Other techniques may also be used to align the phase and amplitude signals through adjustment of the fractional delay. As noted in greater detail above, where the fractional delay filter is a finite impulse response filter, the adjustment of the fractional delay may be performed by selecting different coefficients for the taps of the filter. Such a selection may be made from among sets of predetermined coefficients in a lookup table. The coefficients in the lookup table may be predetermined based on techniques such as convex optimization or minimum mean square error optimization.

In the foregoing specification, specific embodiments have been described. However, one of ordinary skill in the art would appreciate that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may comprise one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Accordingly, some embodiments of the present disclosure, or portions thereof, may combine one or more processing devices with one or more software components (e.g., program code, firmware, resident software, micro-code, etc.) stored in a tangible computer-readable memory device, which in combination form a specifically configured apparatus that performs the functions as described herein. These combinations that form specially programmed devices may be generally referred to herein as "modules." The software component portions of the modules may be written in any computer language and may be a portion of a monolithic code base, or may be developed in more discrete code portions such as is typical in object-oriented computer languages. In addition, the modules may be distributed across a plurality of computer platforms, servers, terminals, and the like. A given module may even be implemented such that separate processor devices and/or computing hardware platforms perform the described functions.

Moreover, an embodiment can be implemented as a computer-readable storage medium having computer readable code stored thereon for programming a computer (e.g., comprising a processor) to perform a method as described and claimed herein. Examples of such computer-readable storage media include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method comprising:
   receiving at a polar receiver a modulated signal having a variable phase component and a variable amplitude component;
   generating, using an amplitude detection circuit, a series of digital amplitude signals representing an amplitude of the modulated signal;
   generating, using a phase detection circuit, a series of digital phase signals representing a phase of the modulated signal;
   generating an aligned series of digital amplitude and digital phase signals from the received modulated signal by filtering at least one of the series of digital amplitude signals and the series of digital phase signals with a fractional delay filter, the fractional delay filter having a variable delay, wherein a time delay of the at least one of the series of digital amplitude signals and series of digital phase signals is adjusted with respect to another of the series of digital amplitude and digital phase signals;
   determining an error value based on the aligned series of digital amplitude and digital phase signals; and
   further aligning the aligned series of digital amplitude and digital phase signals by adjusting the variable delay based on the determined error value.

2. The method of claim 1, wherein the fractional delay filter is a finite impulse filter having a plurality of taps and a coefficient associated with each tap.

3. The method of claim 2, wherein adjusting the variable delay includes selecting predetermined coefficients from a lookup table.

4. The method of claim 3, wherein the coefficients are predetermined using convex optimization.

5. The receiver of claim 3, wherein the coefficients in the lookup table are predetermined using a minimum mean square error optimization.

6. The method of claim 1, wherein only the series of digital amplitude signals is filtered with the fractional delay filter.

7. The method of claim 1, wherein aligning the digital signals includes:
   determining an error vector magnitude from the digital signals; and
   adjusting the variable delay based on the error vector magnitude.

8. The method of claim 7, wherein determining the error vector magnitude includes:
   processing the digital signals to determine an in-phase component and a quadrature component; and
   comparing the determined in-phase and quadrature components with respective in-phase and quadrature components of a probable constellation symbol to determine the error vector magnitude.

9. The method of claim 8, wherein determining the in-phase and quadrature component is performed using a coordinate rotation digital computer (CORDIC) technique.

10. The method of claim 1, further comprising determining a constellation point from the aligned digital signals.

11. The method of claim 1, further comprising providing coarse alignment by delaying at least one of the digital signals using a circular buffer.

12. A polar receiver comprising:
- a signal input operative to receive a modulated signal having a variable phase component;
- an amplitude detection circuit operative to generate a series of digital amplitude signals representing an amplitude of the modulated signal;
- a phase detection circuit operative to generate a series of digital phase signals representing a phase of the modulated signal;
- a fractional delay filter operative to generate an aligned series of digital amplitude and digital phase signals from the received modulated signal by filtering at least one of the series of digital amplitude signals and the series of digital phase signals, the fractional delay filter having a variable delay, wherein a time delay of the at least one of the series of digital amplitude signals and series of digital phase signals is adjusted with respect to another of the series of digital amplitude and digital phase signals;
- error logic operative to determine an error value based on the aligned digital amplitude and digital phase signals; and
- alignment circuitry operative to adjust the variable delay based on the determined error value to further align the series of digital amplitude signals with the series of digital phase signals.

13. The receiver of claim 12, wherein the alignment circuitry comprises:
- coordinate rotation digital computer (CORDIC) logic operative to determine an in-phase component and a quadrature component corresponding to the digital signals;
- error logic operative to compare the determined in-phase and quadrature components with respective in-phase and quadrature components of a probable constellation point to determine an error vector magnitude; and
- a controller operative to select the variable delay based on the error vector magnitude.

14. The receiver of claim 12, wherein the fractional delay filter is a finite impulse filter having a plurality of taps and a coefficient associated with each tap.

15. The receiver of claim 14, further comprising a non-volatile storage medium storing a lookup table, wherein the lookup table associates each of a plurality of available delays with an associated set of coefficients for the finite impulse response filter.

16. The receiver of claim 12, wherein the coefficients in the lookup table are predetermined using convex optimization.

17. The receiver of claim 12, wherein the coefficients in the lookup table are predetermined using a minimum mean square error optimization.

18. The receiver of claim 12, wherein the phase detection circuit includes a time-to-digital converter.

19. The receiver of claim 12, wherein the phase detection circuit includes an injection-locked oscillator and a mixer.

20. The receiver of claim 12, wherein the phase detection circuit includes a phase-locked loop.

* * * * *